United States Patent
Brzus

(10) Patent No.: US 11,859,677 B2
(45) Date of Patent: Jan. 2, 2024

(54) CAGE FREEWHEEL WITH BEARING ROLLERS

(71) Applicant: RINGSPANN GmbH, Bad Homburg (DE)

(72) Inventor: Augustyn Brzus, Bad Homburg (DE)

(73) Assignee: RINGSPANN GmbH, Bad Homburg (DE)

(*) Notice: Subject to any disclaimer, the term of this patent is extended or adjusted under 35 U.S.C. 154(b) by 0 days.

(21) Appl. No.: 18/301,298

(22) Filed: Apr. 17, 2023

(65) Prior Publication Data

US 2023/0341011 A1    Oct. 26, 2023

(30) Foreign Application Priority Data

Apr. 25, 2022  (DE) .......................... 102022109860.5

(51) Int. Cl.
*F16D 41/07* (2006.01)
*F16C 19/26* (2006.01)
*F16D 41/06* (2006.01)

(52) U.S. Cl.
CPC .............. *F16D 41/07* (2013.01); *F16C 19/26* (2013.01); *F16D 2041/0605* (2013.01)

(58) Field of Classification Search
CPC .. F16D 41/07; F16D 41/28; F16D 2041/0605; F16C 19/26; F16C 19/28
See application file for complete search history.

(56) References Cited

U.S. PATENT DOCUMENTS

| 2,327,237 | A | | 8/1943 | Baden | |
|---|---|---|---|---|---|
| 2,883,023 | A | * | 4/1959 | Szady | F16C 33/363 192/45.1 |
| 5,676,226 | A | * | 10/1997 | Lampela | F16D 41/07 192/113.32 |
| 6,044,947 | A | * | 4/2000 | Kinoshita | F16D 41/07 192/41 A |
| 6,279,708 | B1 | | 8/2001 | Yatabe et al. | |

FOREIGN PATENT DOCUMENTS

| DE | 1060670 | 7/1959 |
|---|---|---|
| DE | 1062069 | 7/1959 |
| DE | 1862601 | 11/1962 |
| DE | 1157037 | 11/1963 |

(Continued)

*Primary Examiner* — Timothy Hannon
(74) *Attorney, Agent, or Firm* — Volpe Koenig

(57) ABSTRACT

A cage freewheel for installation into the clamping gap of a shaft/hub connection, in particular in an e-bike drive, includes an annular cage with, following one another in the circumferential direction, bearing rollers for mounting the hub and the shaft together, and clamping bodies arranged pivotably in the cage. The clamping bodies block a relative movement between the shaft and the hub in a frictionally locking manner in one rotational direction, and allow rotation in the other rotational direction, and are spring-loaded in the coupling direction by an annular spring which extends around the row of the clamping bodies in a slot in the radially outer surface of the clamping bodies. The bearing rollers are arranged in each case in pairs in associated pockets of the cage on both sides of the annular spring. Here, the bearing rollers are received in a positively locking manner in the associated pockets.

8 Claims, 2 Drawing Sheets

(56) References Cited

FOREIGN PATENT DOCUMENTS

| | | |
|---|---:|---:|
| DE | 3046818 | 6/1982 |
| DE | 3338055 | 5/1985 |
| DE | 4034517 | 5/1991 |
| DE | 29507294 | 6/1995 |
| DE | 19531905 | 3/1997 |
| DE | 102008019223 | 11/2009 |
| DE | 102008021962 | 11/2009 |
| DE | 102009030614 | 2/2010 |
| DE | 102009017598 | 10/2010 |
| DE | 102009054199 | 5/2011 |
| DE | 102010010640 | 9/2011 |
| DE | 102011108413 | 4/2012 |
| DE | 102019218785 | 6/2012 |
| DE | 102013215994 | 2/2015 |
| DE | 102014117162 | 5/2015 |
| DE | 102013021636 | 6/2015 |
| DE | 202017106205 | 2/2019 |
| DE | 102017129773 | 6/2019 |
| DE | 102018117839 | 1/2020 |
| DE | 102018129894 | 5/2020 |
| DE | 202019106004 | 3/2021 |
| DE | 102019218785 | 6/2021 |
| DE | 102023100875 | 7/2023 |
| EP | 3540251 | 9/2019 |
| JP | S59108829 | 7/1984 |

\* cited by examiner

CAGE FREEWHEEL WITH BEARING ROLLERS

CROSS-REFERENCE TO RELATED APPLICATIONS

This application claims priority from German Patent Application No. 10 2022 109 860.5, filed Apr. 25, 2022, which is incorporated herein by reference as if fully set forth.

TECHNICAL FIELD

The present invention relates to a cage freewheel for installation into the clamping gap of a shaft/hub connection, in particular in the drive of an e-bike.

BACKGROUND

Cage freewheels are known in numerous embodiments, cf., for example, DE 10 2009 030 614 and DE 10 2011 108 413 from the same applicant.

It is important in the case of a freewheel that the shaft and the hub, into the clamping gap of which the freewheel is to be installed, have to be mounted as far as possible without play in the radial direction with respect to one another. As a rule, this takes place via an additional anti-friction bearing which is separate from the freewheel. This increases, however, the axial structural dimension of the shaft/hub connection. In different applications, in particular in the bottom bracket of an e-bike drive, an axial structural dimension which is as small as possible is desired.

DE 10 2019 201878.5 A1 has disclosed a cage freewheel which is fitted in a manner which follows one another in the circumferential direction both with bearing rollers and with clamping bodies. Here, the bearing rollers serve to mount the shaft and the hub with respect to one another. The clamping bodies are arranged pivotably, with the result that they block a relative movement between the shaft and the hub in a frictionally locking manner in one rotational direction, and enable it in the other rotational direction. An annular spring which runs around the clamping body row in a slot in the radial outer surface of the clamping body ensures initial loading of the clamping bodies in the coupling direction. The bearing rollers are arranged in each case in pairs in associated pockets of the cage ring on both sides of the annular spring. In this way, an anti-friction bearing function is also integrated into the freewheel cage by way of the bearing rollers.

A disadvantage in the case of a cage freewheel of this type is its complicated and difficult assembly. While the clamping bodies are held by way of the annular spring which lies from the outside around the cage freewheel and are secured against falling out, the bearing rollers which are arranged on both sides of the annular spring can fall out easily during the assembly of the cage. Moreover, the axial position of the rollers is not fixed, which can lead to more difficult assembly of the annular spring and to collision of the rollers with the annular spring. The collision can cause the malfunction of the cage freewheel. It is therefore an object of the present invention to specify a cage freewheel, in the case of which the assembly and installation into a shaft/hub connection are simplified and/or the functionality of the cage freewheel is improved.

U.S. Pat. No. 6,279,708 discloses a freewheel with an integrated ball bearing, in the case of which a ball bearing row and a clamping body row are arranged next to one another between an inner ring and an outer ring. The balls and the clamping bodies are arranged in a cage which receives the balls in a positively locking manner in the axial direction between the inner and outer ring. During the assembly or when the inner and outer ring are dismantled, the balls can also fall out in the radial direction here.

SUMMARY

The object is achieved by a cage freewheel with one or more of the features described herein. Advantageous refinements can be gathered from the description and claims that follow.

In the case of a cage freewheel of the type mentioned at the outset, it is provided according to the invention that the bearing rollers are received in a positively locking manner in the radial direction in their associated (first) pockets of the annular cage. This firstly simplifies the fitting of the cage during the production of the cage freewheel and the subsequent installation of the cage freewheel between a shaft and a hub, since the bearing rollers can no longer fall out and be lost. As a result, the user obtains an assembly which can be pushed simply into the annular gap between the shaft and the hub.

The positively locking receiving of the rollers in the freewheel cage can also be achieved by virtue of the fact that the freewheel cage is assembled from a plurality of cage parts which are latched to one another during the assembly. A particularly advantageous construction results, however, if the freewheel cage is produced from an elastically deformable plastic, in particular as an injection molded part, and the bearing rollers are clipped into their pockets by way of elastic deformation of the cage. The cage can therefore be configured in one piece. The installation of the bearing rollers can take place both before fitting with clamping pieces and insertion of the annular spring, and also afterward, by the bearing rollers being pressed simply from the outside or inside into their associated pockets.

In the case of one preferred embodiment, the pockets for the bearing rollers have a width on a circumferential side of the cage, which width corresponds at least to the circumference of the bearing rollers, and have at least one pair, preferably two pairs, of projections which protrude into the interior of the pockets and via which the bearing rollers are held in a positively locking manner in the radial direction in the pockets. Therefore, the freewheel cage does not have to be deformed over the overall length of the bearing roller, but rather only in the region of the projections, with the result that the required assembly forces are reduced. The greater the recesses between the projections and the smaller the radial length of the projections, the lower the required deformation forces. If the pockets have corresponding projections both on the outer circumferential side of the cage and also on its inner circumferential side, the bearing rollers can optionally be pressed both from the inside and from the outside into their pockets.

The bearing rollers are preferably positioned in the axial direction by way of inner surfaces of the cage side edges and a center web which separates the pockets which are arranged in pairs from one another. The width of the web between the pockets is preferably greater than the diameter or the width of the annular spring.

In the case of the cage freewheel, at least three, preferably five pairs of bearing rollers are preferably arranged distributed over the circumference of the cage in associated pockets. Here, a plurality of (second) pockets with clamping bodies are provided in each case in the circumferential direction between the (first) pockets with the bearing rollers. At least three, preferably five roller pairs ensure reliable radial orientation of the shaft and hub components with respect to one another. The space which remains in the circumferential direction can be utilized for clamping bodies, with the result that a sufficiently great clamping area is available, in order to transmit the forces which occur between the shaft and the hub in the blocking direction. Here, at least two, further preferably at least four clamping bodies are preferably arranged so as to follow one another in the circumferential direction, before one bearing roller again follows in the circumferential direction. The cage freewheel therefore has at least twice as many, preferably at least four times as many clamping bodies as bearing rollers. It can fundamentally be said that the more clamping bodies are available, the higher the torques which can be transmitted in the blocking direction of the freewheel.

The bearing rollers can optionally be connected to one another in their pockets in each case in pairs via a common axle or can be configured in one piece with a common axle. In the case of the installation of the bearing rollers from the outside, the bearing rollers in this case have to be clipped into their pockets before the assembly of the annular spring. Higher turning torques between the shaft and the hub can be absorbed by way of a single-piece connection of the bearing rollers on both sides of the annular spring.

The pockets for the clamping bodies are expediently separated from one another by way of webs, and the free spacing between the webs is dimensioned in each case in such a way that it is greater than a radially inner transverse extent but smaller than a radially outer transverse extent, oriented in the circumferential direction, of the clamping bodies. The clamping bodies can therefore be inserted from the outside into their pockets, and the annular spring can subsequently be mounted, which annular spring holds the clamping bodies in the freewheel cage, since the clamping bodies cannot fall through between the webs toward the inside. In this way, the clamping bodies are held in the freewheel cage by way of the annular spring, while the bearing rollers are secured against falling out in the radial direction by way of a positively locking connection.

BRIEF DESCRIPTION OF THE DRAWINGS

Further advantages and refinements result from the exemplary embodiment which is described in the following text on the basis of the figures, in which.

DETAILED DESCRIPTION

Figure 1:
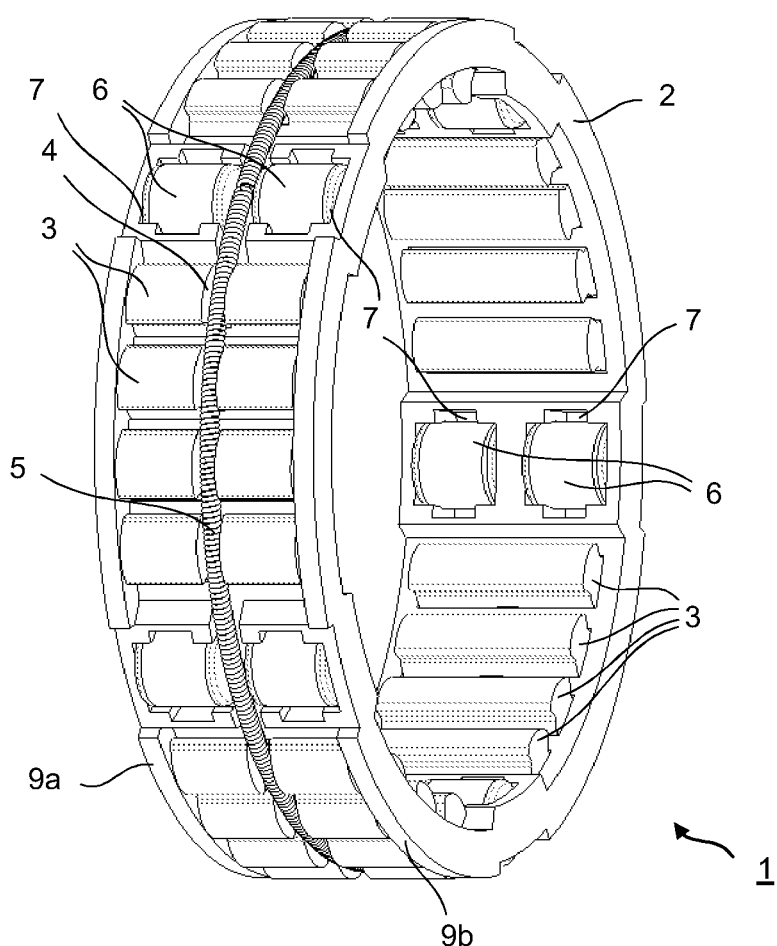
FIG. 1 shows an isometric illustration of a cage freewheel with clamping bodies and bearing rollers.

The cage freewheel 1 which is shown in FIG. 1 comprises an annular cage 2 (cage ring) with clamping bodies 3 which are inserted pivotably therein in a manner known per se. The clamping bodies 3 have a slot 4 centrally, into which an annular spring 5, for instance a spiral spring, is inserted around the entire circumferential surface of the clamping body row, which annular spring 5 loads the clamping bodies 3 in the coupling direction. The cage freewheel serves for installation into the annular gap between a shaft component and a hub component, the inner circumferential surface of the hub component and the outer circumferential surface of the shaft component being configured in each case as cylindrical raceways for the clamping bodies 3. Those edge faces of the clamping bodies 3 which are oriented toward the inner and outer raceways on shaft components and hub components act as clamping wedges which jam the shaft component with respect to the hub component in one rotational direction, that is to say in the blocking direction of the freewheel, and thus block a relative rotation. In the opposite rotational direction, that is to say in the freewheel direction, the shaft component can be rotated freely in the case of a stationary hub component, for example.

The cage freewheel 1 according to the invention can fundamentally also be inserted, instead of directly between a shaft component and a hub component, between a freewheel inner ring and a freewheel outer ring which are then in each case pressed onto the shaft component and pressed into the hub component, and form the cylindrical raceways for the clamping bodies 3.

In order to center the shaft component with respect to the hub component in the shaft/hub connection, the cage freewheel 1 has additional bearing rollers 6 which are inserted in each case in pairs into corresponding pockets 7 of the freewheel cage 2 on both sides of the annular spring 5 and assume the function of a roller bearing. Four clamping bodies 3 which follow one another are situated in each case between two roller pairs 6, with the result that four times as many clamping bodies as roller pairs are arranged distributed over the circumference.

The clamping bodies 3 of a clamping-body freewheel which are frequently also called clamping pieces are of non-round configuration due to their design, that is to say have a long and a short transverse direction of extent. In their long transverse extent, the clamping bodies 3 are somewhat wider than the diameter of the bearing rollers 6, with the result that, during coupling, they jam in the annular gap which is formed by the outer surface of the shaft part and the inner running surface of the hub part. In the short transverse direction of extent, the clamping bodies 3 are somewhat narrower than the diameter of the bearing rollers 6, with the result that, loaded against the running surfaces of the annular gap in the coupling direction, they slide along on them.

Figure 2:
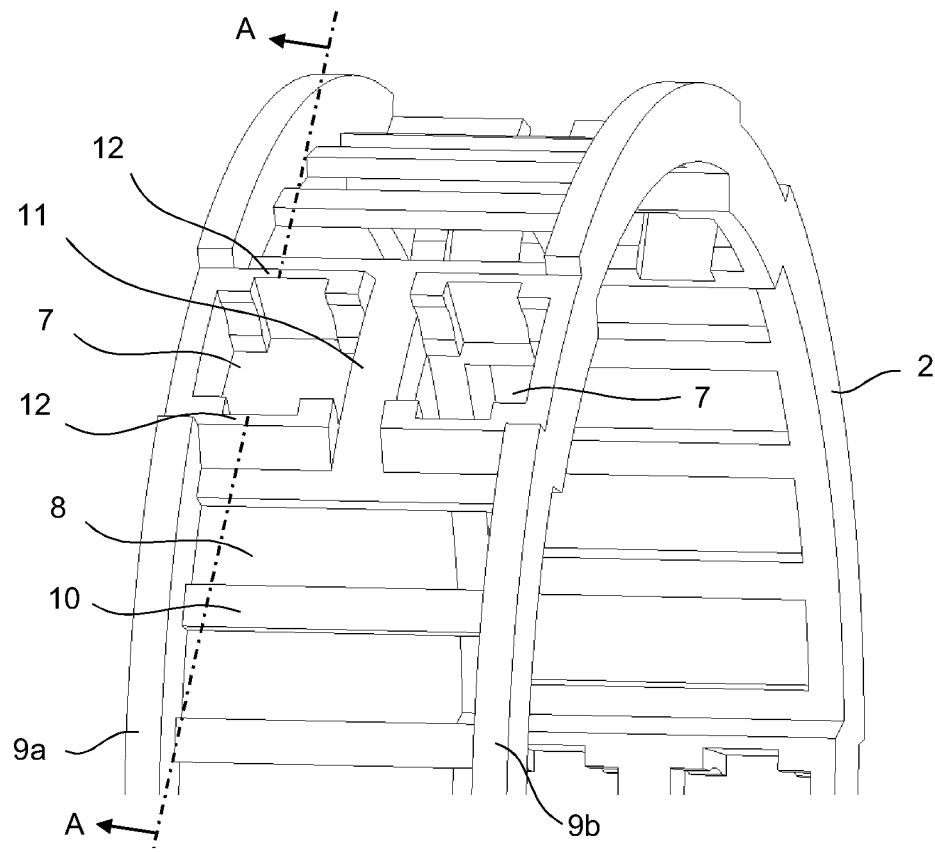
FIG. 2 shows an enlarged illustration of the freewheel cage of the cage freewheel which is shown in FIG. 1.
Figure 3:
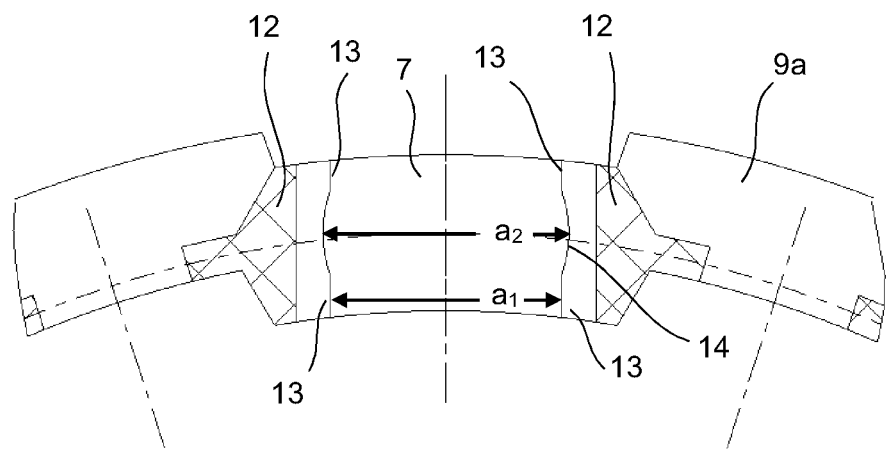
FIG. 3 shows a section along the sectional line A-A in FIG. 2.

The cage 2 is shown in greater detail in FIG. 2. It has two annular edge strips 9a, 9b which form the cage side edges and are connected to one another via webs 10 which run in the axial direction. Receiving pockets 8 for the clamping bodies 3 are configured between the webs 10. One pocket pair 7 for bearing rollers 6 follows after in each case four pockets 8 for clamping bodies 3. The annular spring 5 runs over the center web 11 in the case of the finally assembled cage freewheel.

The pockets 7 are configured in such a way that they receive the bearing rollers 6 in each case in a positively locking manner. To this end, projections or cams 13 which protrude in each case lying radially on the inside and lying radially on the outside into the interior of the pockets are arranged on the lateral boundary webs 12 of the pockets 7. The spacing $a_1$ of two cams 13 in the circumferential direction is smaller than the external diameter of a bearing roller 6. A rounded contour 14 which is adapted to the circumferential course of the bearing rollers 6 is configured between the inner and outer projection 13 of a boundary web 12. The spacing $a_2$ in the center between two opposite rounded contours 14 is selected to be somewhat greater here than the diameter of the bearing rollers 6.

The cage 2 is produced from a high-quality plastic material such as, for instance, polyamide or polyetheretherketone (PEEK) which has a certain elastic property. As a result, the bearing rollers 6 can be pressed from the inside or from the outside into the relevant pockets 7 during assembly. As a result of the pressure on the bearing rollers 6, the associated pocket 7 is widened by way of elastic deformation of the projections 13. After the bearing roller 6 reaches its central radial position, the deformation eases and the bearing roller 6 is held in the center of the pocket by way of the projections 13 and the curved contour 14.

The bearing roller 6 is positioned in the axial direction in the pocket 7 by way of inner surfaces of the edge strip 9*a* and the edge strip 9*b* and the central web 11. The width of the central web 11 is greater than the external diameter of the annular spring. This ensures that the bearing rollers do not come into contact with the annular spring during assembly and later during operation.

In order to assemble the cage freewheel, the cage 2 can first of all be fitted with clamping pieces 3, by the latter being inserted radially from the outside into the pockets 8. The spacing between two webs 10 in the circumferential direction is dimensioned in such a way that it is greater than the width, oriented in the circumferential direction, of the radially inner side of the clamping bodies 3. The radially outer width of the clamping bodies 3 is greater, however, than the spacing between two boundary webs 8, with the result that the clamping bodies 3 cannot fall inward through their pockets 8. Subsequently, the annular spring 5 is placed around the clamping pieces 3, and finally the bearing rollers 6 can be pressed into their associated pockets 7. It is likewise possible that the pockets 7 are first of all fitted with the bearing rollers 6 and subsequently the clamping bodies 3 are inserted into the pockets 8 and the annular spring 5 is placed around the outer circumference of the clamping body row.

In the case of the finally assembled cage freewheel, the clamping bodies 3 are therefore held by way of the annular spring 5, while the bearing rollers 6 are held in a positively locking and captive manner in their pockets. The finally assembled cage freewheel can therefore be pushed onto a shaft component in order to establish a freewheel, and can be inserted with the latter into an associated hub component or, conversely, can be pushed into a hub component and a shaft component can subsequently be plugged through.

Different modifications of the cage freewheel which is shown in the exemplary embodiment are possible and included within the context of the present invention. Thus, for example, instead of five pairs of bearing rollers, more or fewer bearing roller pairs can also be used. For example, a minimum of three bearing roller pairs can be arranged distributed at a 120° angle around the circumference of the freewheel cage, with the result that more space for further clamping bodies remains. The bearing rollers 6 of one bearing roller pair can also be connected to one another via a common central axle. In this case, the central web 11 can be dispensed with, or it can be provided with a corresponding cutout for the common axle of the bearing roller pair 6. Additional guide surfaces which delimit the pivoting movement of the clamping bodies can be configured on the axially inner end sides of the edge strips 9*a* and 9*b*. Pins can likewise be provided on the axially inner end faces of the edge strips 9*a*, 9*b*, which pins engage into the corresponding end-side recesses of the clamping bodies and, as a result, define a pivoting axle for the clamping bodies. In this case, the assembly of the clamping bodies can also take place by way of slight pressure and associated elastic deformation of the cage 2, until the pins latch into the end-side recesses of the clamping bodies. Corresponding pins on the clamping bodies and recesses for the pins can likewise be provided on the inner end faces of the edge strips 9*a*, 9*b*. Furthermore, it would be possible, however, for the cage to be configured in two parts with, for example, two-part rings which are latched to one another via latching connections in the region of the webs 10, 12, as disclosed, for example, in DE 20 2017 106205 U1.

The invention claimed is:

1. A cage freewheel (1) for installation into a clamping gap between a shaft and a hub, the cage freewheel comprising:
   an annular cage (2) fitted with, following one another in a circumferential direction, bearing rollers (6) for mounting the hub and the shaft with respect to one another, and clamping bodies (3) which are arranged pivotably in the cage (2);
   the clamping bodies (3) are configured to block a relative movement between the shaft and the hub in a frictionally locking manner in one rotational direction, and enable the relative rotational movement in an opposite rotational direction;
   an annular spring (5) that spring-loads the clamping bodies (3) in a coupling direction, the annular spring (5) extends around a row of the clamping bodies (3) in a slot (4) in a radially outer surface of the clamping bodies (3);
   the bearing rollers (6) are arranged in each case in pairs in associated pockets (7) of the cage (3) on both sides of the annular spring (5); and
   the bearing rollers (6) are received in a positively locking manner in a radial direction in the associated pockets (7).

2. The cage freewheel as claimed in claim 1, wherein the cage (2) is produced from an elastically deformable plastic, and the bearing rollers (6) are clipped into the associated pockets (7) by an elastic deformation of the cage (2).

3. The cage freewheel as claimed in claim 1, wherein the associated pockets (7) for the bearing rollers (6) have: a width on at least one circumferential side of the cage (2), said width corresponds at least to a circumference of the bearing rollers (6), and at least one pair of projections (13) which protrude into an interior of the pockets and via which the bearing rollers (6) are held in a positively locking manner in the radial direction in the associated pockets (7).

4. The cage freewheel as claimed in claim 1, wherein at least three pairs of the bearing rollers (6) are arranged distributed over a circumference of the cage (2) in the associated pockets (7), and a plurality of pockets (8) are provided in the cage (2) with the clamping bodies (3) in each case in the circumferential direction between the associated pockets (7) with the bearing rollers (6).

5. The cage freewheel as claimed in claim 4, wherein at least two of the clamping bodies (3) follow one another in the circumferential direction before one of the pairs of the bearing rollers (6) again follows in the circumferential direction.

6. The cage freewheel as claimed in claim 4, wherein the pockets (8) for the clamping bodies (3) are separated from one another by webs (10), and a free spacing between the webs (10) is dimensioned in each case such that the free spacing is greater than a radially inner width and smaller than a radially outer width, oriented in the circumferential direction, of the clamping bodies (3).

7. The cage freewheel as claimed in claim 1, wherein the pairs bearing rollers (6) are connected to one another in the associated pockets (7) in each case via a common axle.

8. The cage freewheel as claimed in claim 1, wherein the pairs of the bearing rollers (6) are positioned axially by way of inner surfaces of cage side edges (9*a*, 9*b*) of the cage (2)

and a center web (11) which separates the associated pockets (7) which are arranged in pairs from one another.

\* \* \* \* \*